United States Patent [19]
Milster et al.

[11] Patent Number: 6,111,839
[45] Date of Patent: Aug. 29, 2000

[54] OPTICAL PICKUP HEAD INCLUDING A COHERENT FIRST ORDER MODE LASER LIGHT SOURCE

[75] Inventors: Tom D. Milster, Tucson; Wenbin Jiang, Phoenix; Michael S. Lebby, Apache Junction, all of Ariz.

[73] Assignee: Motorola, Inc., Schaumburg, Ill.

[21] Appl. No.: 08/895,781

[22] Filed: Jul. 17, 1997

[51] Int. Cl.$^7$ .................................................. G11B 7/08
[52] U.S. Cl. ..................................... 369/112; 369/122
[58] Field of Search .............................. 369/44.23, 110, 369/112, 121–122

[56] References Cited

U.S. PATENT DOCUMENTS

| | | | |
|---|---|---|---|
| 5,446,754 | 8/1995 | Jewell et al. ............................ | 372/50 |
| 5,757,741 | 5/1998 | Jiang et al. ........................... | 369/44.12 |
| 5,802,036 | 9/1998 | Ohba et al. ............................ | 369/112 |
| 5,886,972 | 3/1999 | Jiang et al. ........................... | 369/116 |
| 5,892,749 | 4/1999 | Yamanaka ............................... | 369/112 |

*Primary Examiner*—W. R. Young
*Attorney, Agent, or Firm*—Eugene A. Parsons

[57] ABSTRACT

An optical pickup head for high density optical storage applications and a method of fabrication including a first order mode light source and a phase shift mask. The light source is capable of emitting a power output of at least 10 mW. The phase shift mask positioned to allow for a 180° shift in light emitted therethrough, thereby creating a reduced focal spot size for high density data write applications. The optical pickup head capable of high density read and write applications for both CDs and DVDs.

21 Claims, 2 Drawing Sheets

OPTICAL PICKUP HEAD INCLUDING A COHERENT FIRST ORDER MODE LASER LIGHT SOURCE

FIELD OF THE INVENTION

This invention relates to an optical pickup head and more particularly to an optical pickup head for use in high density optical data storage applications.

BACKGROUND OF THE INVENTION

The rapid advancement of multimedia applications requires a system that stores more information more compactly, and is easier to use and handle. Digital video disc (DVD) technology offers this high density format advantage. DVD technology is based on a new generation of a compact disc format which provides for increased storage capacity and performance, especially for video and multimedia applications.

Compact disc (CD) technology has become the global standard for music, entertainment and computer software. Although extremely popular, CD technology has yet been able to provide high density formats. A compact disc (CD) can typically only store approximately five minutes worth of analog image information, and a larger size laser disc of 11.8 inches can store approximately sixty minutes of analog image information. Accordingly, the movie/entertainment and computer industries want to pursue high density formats, such as that found in DVD technology.

As the industry introduces this new digital technology, and other high density optical storage devices, an increasingly important consideration is the beam profile of the pickup head light source and the required focal spot size of the pickup head light source in achieving optimal performance. In general, a high density format disc, such as a DVD disc, has a pit length of 0.4 µm and a track pitch of 0.74 µm, almost half that of a CD format disc. During operation of these high density format discs, data reading applications require 3–4 mW of power, while data writing applications require a minimum of 10 mW to operate. Therefore, when utilizing a single mode optical light source, there is a requirement for operation at a higher power. Typically the focal spot size of a high power multimode output light source is too large to allow for writing data to the high density data storage device. Accordingly, to utilize such high power multimode optical light sources in data writing applications, the focal spot size of the high power light output beam must be reduced in size.

Many light sources can potentially be utilized for these high density read and write applications, such as any type of coherent laser light source, as long as it operates in a donut or first order Hermite-Gaussian mode. Light sources such as organic laser, semiconductor lasers, gas lasers, solid state lasers, or higher mode lasers with at least two lobes that are capable of undergoing a phase shift, or other similar light sources can be utilized taking into account the necessary adjustments to reduce the focal spot size. In particular, there is a strong desire to utilize a donut mode vertical cavity surface emitting laser (VCSEL) and/or first order mode light source to achieve the required high power output, yet in doing so there remains the need to minimize the focal spot size for data writing applications to high density data storage discs.

It would be highly advantageous to remedy the foregoing high power versus focal spot size challenge and other deficiencies inherent in the prior art. Thus, it is highly desirable and an object of the present invention to provide for an optical head that utilizes a first order mode light source to maintain sufficient power output while having an optical focal spot size of reduced dimension so as to allow for optimal operation in a data write mode. Accordingly, proposed is a low cost optical pickup head to be used for high density optical data storage.

Another object of the invention is to provide for an optical head having a sufficient output power for data write applications.

It is yet another object of the present invention to provide for an optical head that includes a small focal spot size for the writing of information to and from, high density optical storage devices, such as CDs and DVDs.

It is another object of the present invention to provide for an optical head that allows for greater data storage density.

Still another object of the present invention is to provide for a method of fabricating an optical head that allows for high power operation while maintaining reduced focal spot size for use in both optical read and write applications.

Yet another object of the invention is to reduce the complexity, thus cost, of a high density optical storage pickup head.

SUMMARY OF THE INVENTION

Briefly, to achieve the desired objects of the instant invention in accordance with a preferred embodiment thereof, provided is an optical pickup head for high density optical storage applications including a coherent mode light source, a phase shift mask, and an optical element. The light source is capable of emitting light in a path having a power output of at least 10 mW. The phase shift mask positioned to allow for a 180° phase-shift in light emitted therethrough. The optical element positioned to focus the phase corrected light into a focal spot of reduced size for high density data write applications.

In addition, included is a method of fabricating an optical pickup head for high density optical storage applications including providing a coherent light source emitting light in a path, and positioning a phase shift mask and an optical element in the path of the emitted light and emitting light from the light source of at least 10 mW. The phase shift mask positioned in the path of emitted light to allow for a 180° phase-shift in light passing therethrough prior to focusing into a focal spot by the optical lens. The shifting of light passing therethrough the phase shift mask creating a focal spot of reduced size for high density data write applications.

BRIEF DESCRIPTION OF THE DRAWINGS

The novel features believed characteristic of the invention are set forth in the claims. The invention itself, however, as well as other features and advantages thereof will be best understood by reference to detailed descriptions which follow, when read in conjunction with the accompanying drawings, wherein:

DETAILED DESCRIPTION OF THE DRAWINGS

Figure 1:
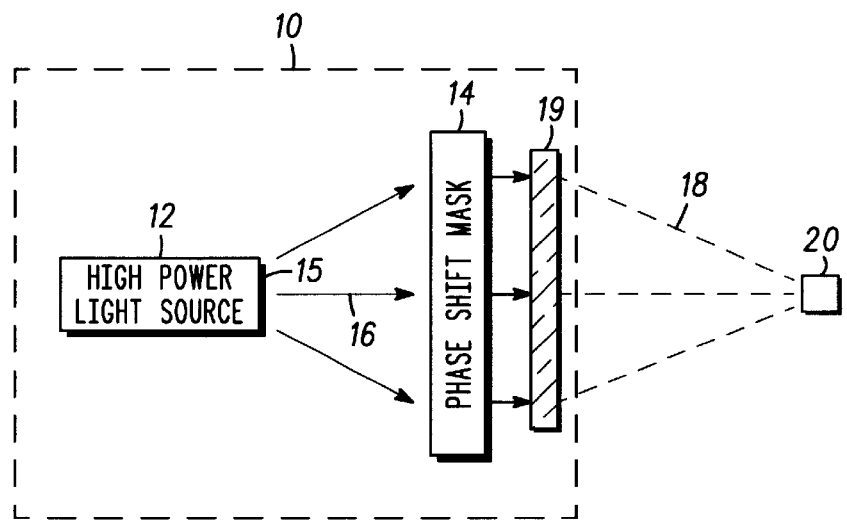
FIG. 1 is a schematic view showing an optical pickup head module in accordance with the present invention.

Turning now to the drawings, attention is first directed to FIG. 1 which illustrates in a schematic sectional view an optical pickup head module in accordance with the present invention. Illustrated is an optical pickup head 10, composed of a coherent light source 12, such as a coherent laser light source, more specifically a coherent first order mode laser light source, and a phase shift mask 14. Coherent light source 12 is provided to emit light along a path (illustrated by arrows 16). Coherent light source 12 can be any number of coherent laser light sources, capable of operating in a H01 or H10 (first order) mode. An example of typical coherent laser light sources that can be utilized in the present invention include organic lasers, semiconductor lasers, gas lasers, solid state lasers, or some higher mode laser light sources having two lobes with one of the lobes capable of undergoing a 180° phase shift. Typically 3–4 mW of power is required for read applications and at least 10 mW of power is required for data write applications. Accordingly, a light source capable of operating at a high power is required. In this particular embodiment, illustrated is a VCSEL. More particularly, illustrated is a donut mode VCSEL or single mode first order VCSEL that generates high output power. During operation in a data write mode, the high power light source emits light having a specific focal point with a lens of fixed numerical aperture (NA). In order to operate at optimal performance it is necessary to focus the output beam into a spot smaller than the Fourier transform limited spot size of a Gaussian mode. To aid in this focusing of the output beam, optical pickup head 10, as previously stated, includes phase shift mask 14.

Phase shift mask 14 is positioned substantially coextensive with an optical output 15 so as to allow light 16 emitted by light source 12 to pass therethrough phase shift mask 14. Phase shift mask 14 can be composed of any materials, such as a silicon nitride (SiN) material, capable of shifting the phase of light emitted therethrough approximately 180°. In general, phase shift mask 14 serves to correct the mode structure of the light 16 emitted therethrough so as to focus it into a focal spot with a strong center lobe and two side lobes using the same lens of the fixed NA. Phase shift mask 14 has positioned on a side opposite the high power light source 12, a lens element 19. Once light 16 has undergone a shift in phase when passing through phase shift mask 14, it is focused by lens element 19 and light 18 is emitted therethrough having a focal spot size smaller than the diffraction limited Gaussian mode using this lens. More particularly, the focal spot size 20 is reduced to less than 1 micron in size for optical performance of the pickup head 10.

Figure 2:
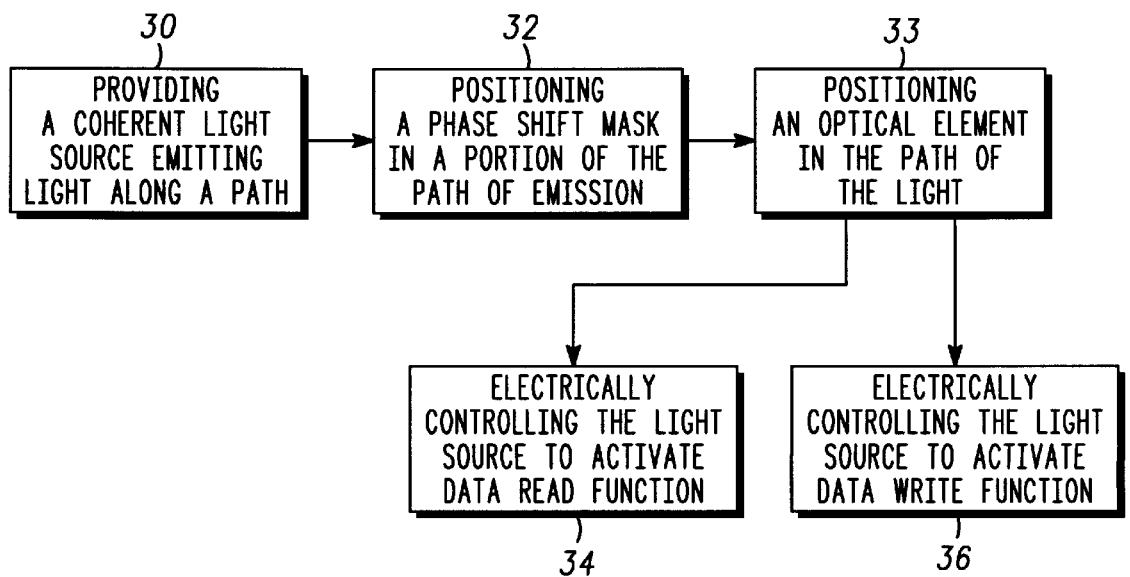
FIG. 2 is a schematic view illustrating the steps in a method of fabricating an optical pickup head in accordance with the present invention.

Referring now to FIG. 2, illustrated are the steps in a method of fabricating an optical pickup head for high density storage applications according to the present invention. Typically, a coherent light source is provided 30 capable of emitting a beam of light along a path at an optical output (discussed previously). There is positioned 32 substantially coextensive a portion of the optical output a 180° phase shift mask. Next, there is positioned 33 an optical element in the path of the emitted light capable of focusing the light passing therethrough into a small focal spot. During operation the coherent light source is electrically controlled to activate a data read function 34 or a data write function 36. During the data read function light would be emitted from the light source but would not pass through the phase shift mask. During the data write function light would be emitted from the high power light source and would pass through the phase shift mask, thereby undergoing a shift in phase and subsequently focused into a small focal spot size.

Figure 3:
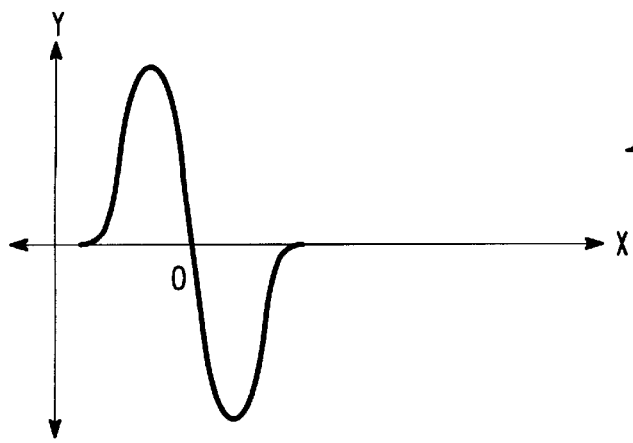
FIGS. 3 and 4 are graphical representations illustrating the amplitude and intensity, respectively, of light emitted by a first order Hermite-Gaussian mode light source in accordance with the present invention.
Figure 4:
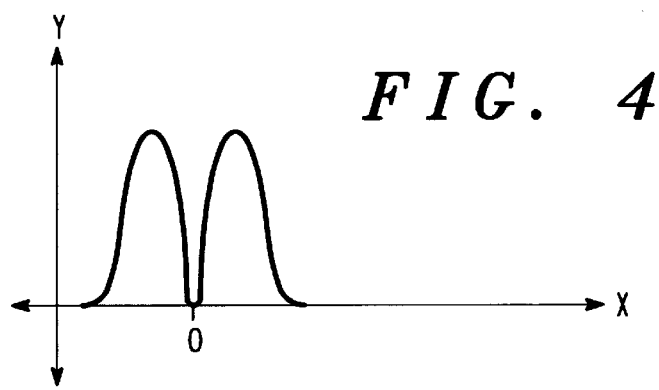

Referring now to FIGS. 3 and 4, provided are graphical representations illustrating the amplitude and intensity, respectively, of light emitted by the coherent light source in accordance with the present invention. As detailed in FIG. 4, there is as a result of the coherent light source a large focal sport which is not good for data write applications.

Figure 5:
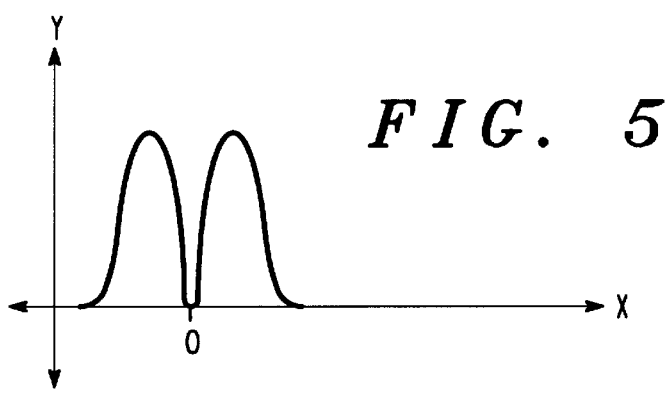
FIGS. 5 and 6 are graphical representations illustrating the amplitude and intensity, respectively, of light emitted by a first order mode light source having passed through a phase shift mask, prior to forming a focal spot in accordance with the present invention.
Figure 6:
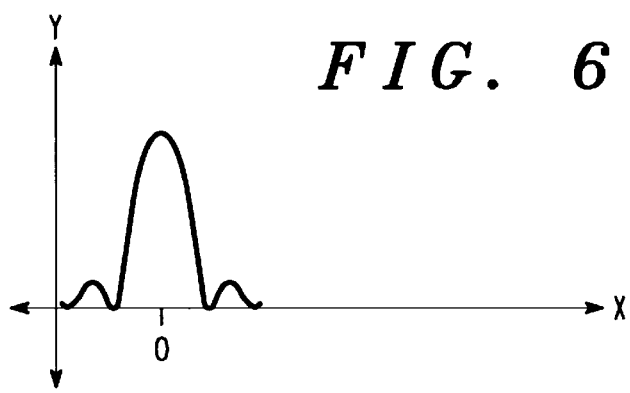

FIGS. 5 and 6 are graphical representations illustrating the amplitude and intensity, respectively, of light emitted by the high power light source having passed through the phase shift mask, prior to being focused into a small focal spot in accordance with the present invention. More specifically, as illustrated in FIG. 6, light emitted by the high power optical light source undergoes a shift in phase, thus a correction in mode structure, and is focused to provide for a large center lobe and two small side lobes. This allows for optimal performance of the optical pickup head in high density data write applications.

Thus, disclosed is an optical pickup head for high density storage, that can be utilized as a reading and writing head for both CD and DVD applications. The optical pickup head includes a coherent light source, such as a donut mode, HO1 or H10 mode light source, for operation in both data read and data write functions. In addition, the optical pickup head includes a phase shift mask and an optical element, together capable of focusing the output beam into a small focal spot for optimal performance in a high density data write mode. This allows for a decrease in the complexity of the design and cost of a pickup head and overcomes the challenges presented in achieving quality high density data read and write results using a single high power light source.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

The various steps of the method disclosed have been performed in a specific order for purposes of explanation, however, it should be understood that various steps of the disclosed method may be interchanged and/or combined with other steps in specific applications and it is fully intended that all such changes in the disclosed methods come within the scope of the claims.

While we have shown and described specific embodiments of the present invention, further modifications and improvement will occur to those skilled in the art. We desire it to be understood, therefore, that this invention is not limited to the particular forms shown and we intend in the appended claims to cover all modifications that do not depart from the spirit and scope of this invention.

What is claimed is:

1. An optical pickup head consisting of:
    a coherent light source emitting light along a path;
    a phase shift mask positioned in a portion of the path of the emitted light, thereby changing the phase of the light passing therethrough; and
    an optical element positioned in a path of the light passing therethrough the phase shift mask, the optical element focusing the emitted light into a small focal spot.

2. An optical pickup head as claimed in claim 1 wherein the coherent light source is one of coherent laser light source.

3. An optical pickup head as claimed in claim 2 wherein the coherent laser light source operates in one of a donut mode, a H01 mode and a H10 mode.

4. An optical pickup head as claimed in claim 3 wherein the coherent laser light source is one of an organic laser, a semiconductor laser, a gas laser, a solid state laser and a laser operating at a mode higher than a first order mode.

5. An optical pickup head as claimed in claim 4 wherein the coherent laser light source is a donut mode vertical cavity surface emitting laser.

6. An optical pickup head as claimed in claim 4 wherein the coherent laser light source is a single mode first order vertical cavity surface emitting laser.

7. An optical pickup head as claimed in claim 1 wherein the phase shift mask is a one-half wavelength phase shift mask.

8. An optical pickup head as claimed in claim 7 wherein the one-half wavelength phase shift mask includes a silicon nitride (SiN) material.

9. An optical pickup head as claimed in claim 1 wherein the small focal spot is less than 1 micron in diameter.

10. An optical pickup head as claimed in claim 1 wherein the light passing therethrough the phase shift mask is focused into a focal spot that is smaller than a Fourier transform limited spot size of a Gaussian mode.

11. An optical pickup head consisting of:
a coherent first order mode laser light source emitting a coherent light along a path;
a one-half wavelength phase shift mask positioned in a portion of the path of the emitted light, thereby changing the phase of the light passing therethrough; and
an optical element positioned a path of the light passing threrthrough the phase shift mask, the optical element focusing the emitted light into a small focal spot of less than one micron in diameter.

12. An optical pickup head as claimed in claim 11 wherein the coherent laser light source operates in one of a donut mode, a H01 mode, and a H10 mode.

13. An optical pickup head as claimed in claim 12 wherein the coherent laser light source is one of an organic laser, a semiconductor laser, a gas laser, a solid state laser and a laser operating at a mode higher than a first order mode.

14. An optical pickup head as claimed in claim 13 wherein the coherent laser light source is a donut mode vertical cavity surface emitting laser.

15. An optical pickup head as claimed in claim 13 wherein the coherent laser light source is a single mode first order vertical cavity surface emitting laser.

16. An optical pickup head as claimed in claim 11 wherein the one-half wavelength phase shift mask includes a silicon nitride (SiN) material.

17. An optical pickup head as claimed in claim 11 wherein the light passing therethrough the phase shift mask is focused into a focal spot that is smaller than a Fourier transform limited spot size of a Gaussian mode.

18. A method fabricating an optical pickup head consisting of the steps of:
providing a coherent first order mode laser light source emitting a coherent light along a path;
positioning a one-half wavelength phase shift mask in a portion of the path of the emitted light, thereby changing the phase of the light passing therethrough; and
positioning an optical element in a path of the light passing therethrough the phase shift mask, the optical element focusing the emitted light into a small focal spot of less than one micron in diameter.

19. A method of fabricating an optical pickup head as claimed in claim 18 wherein the step of providing the coherent laser light source includes the step of providing a coherent laser light source that operates in one of a donut mode, a H01 mode, and a H10 mode.

20. A method of fabricating an optical pickup head as claimed in claim 19 wherein the step of positioning a one-half wavelength phase shift mask includes the step of positioning a one-half wavelength phase shift mask comprised of a silicon nitride (SiN) material over a portion of the path of the emitted light.

21. A method of fabricating an optical pickup head as claimed in claim 20 wherein the step of focusing the emitted light into a small focal spot of less than one micron in diameter includes the step of focusing the focal spot into a focal spot smaller than a Fourier transform limited spot size of a Gaussian mode.

* * * * *

UNITED STATES PATENT AND TRADEMARK OFFICE
CERTIFICATE OF CORRECTION

PATENT NO. : 6,111,839
DATED : August 29, 2000
INVENTOR(S) : Tom D. Milster et al.

It is certified that error appears in the above-identified patent and that said Letters Patent is hereby corrected as shown below:

Column 5, claim 11,
Line 33, after "positioned" add -- in --.

Signed and Sealed this

Nineteenth Day of March, 2002

Attest:

JAMES E. ROGAN
Attesting Officer    Director of the United States Patent and Trademark Office